United States Patent
Kakinami et al.

(10) Patent No.: US 7,583,816 B2
(45) Date of Patent: Sep. 1, 2009

(54) DEVICE FOR DETECTING A ROAD TRAVELING LANE USING AN EDGE HISTOGRAM

(75) Inventors: Toshiaki Kakinami, Nagoya (JP); Takashi Hiramaki, Nagoya (JP); Tokihiko Akita, Nagoya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 534 days.

(21) Appl. No.: 10/572,957

(22) PCT Filed: Sep. 22, 2004

(86) PCT No.: PCT/JP2004/013803

§ 371 (c)(1),
(2), (4) Date: Mar. 21, 2006

(87) PCT Pub. No.: WO2005/029441

PCT Pub. Date: Mar. 31, 2005

(65) Prior Publication Data

US 2007/0107965 A1 May 17, 2007

(30) Foreign Application Priority Data

Sep. 24, 2003 (JP) .............................. 2003-331357

(51) Int. Cl.
G06K 9/00 (2006.01)
G06K 9/46 (2006.01)
G01C 22/00 (2006.01)

(52) U.S. Cl. ....................... 382/104; 382/103; 382/168; 382/190; 382/192; 382/202; 701/28

(58) Field of Classification Search ................. 382/103, 382/104, 106, 108, 181, 190, 192–194, 202, 382/168–172; 701/28

See application file for complete search history.

(56) References Cited

U.S. PATENT DOCUMENTS 5,359,666 A * 10/1994 Nakayama et al. .......... 382/104

(Continued)

FOREIGN PATENT DOCUMENTS

JP 8-249597 A 9/1996

(Continued)

OTHER PUBLICATIONS

Otsuka, et al., Multitype Lane Markers Recognition Using Local Edge Direction, Intelligent Vehicle Symposium, Jun. 17-21, 2002, 604-609 vol. 2, Piscataway, NJ. XP010635890.

(Continued)

*Primary Examiner*—Brian P Werner
*Assistant Examiner*—Barry Drennan
(74) *Attorney, Agent, or Firm*—Sughrue Mion, PLLC (57) ABSTRACT

A device for detecting a road traveling lane, which is capable of stably defining a position of a boundary of a traveling lane. The device has edge point detection means (ED) for detecting a plurality of edge points in a contour on an image, edge histogram producing means (HD) for producing a vertical edge histogram for horizontal elements of the plurality of edge points, block marking line determination means (BD) for determining presence and absence of a block-like marking line on the basis of periodicity of distribution and a combination of distributions of plus edges and minus edges in the vertical edge histogram, and lane boundary edge detection means (MD) for detecting vertical edge points present outside (relative to the center of the traveling lane) of a region where the block-like marking line is present. And, according to lane boundary position defining means (LD), it is so constituted to define a position of a curve fitted to the vertical edge points, as the position of the boundary of the traveling lane.

8 Claims, 4 Drawing Sheets

U.S. PATENT DOCUMENTS

| | | | |
|---|---|---|---|
| 5,555,312 A | 9/1996 | Shima et al. | |
| 5,904,725 A | 5/1999 | Iisaka et al. | |
| 5,991,427 A * | 11/1999 | Kakinami et al. | 382/104 |
| 6,172,600 B1 * | 1/2001 | Kakinami et al. | 340/435 |
| 6,205,234 B1 * | 3/2001 | Kakinami et al. | 382/104 |
| 6,445,809 B1 * | 9/2002 | Sasaki et al. | 382/104 |
| 6,449,383 B1 * | 9/2002 | Oike et al. | 382/104 |
| 6,590,521 B1 * | 7/2003 | Saka et al. | 342/70 |
| 6,788,817 B1 * | 9/2004 | Saka et al. | 382/199 |
| 6,792,147 B1 * | 9/2004 | Saka et al. | 382/199 |
| 2002/0159616 A1 * | 10/2002 | Ohta | 382/104 |
| 2003/0016287 A1 | 1/2003 | Nakayama et al. | |
| 2003/0103650 A1 * | 6/2003 | Otsuka et al. | 382/104 |
| 2004/0054473 A1 * | 3/2004 | Shimomura | 701/301 |

FOREIGN PATENT DOCUMENTS

| | | |
|---|---|---|
| JP | 11-85999 A | 3/1999 |
| JP | 2002-140696 A | 5/2002 |
| JP | 2003-30626 A | 1/2003 |
| JP | 2003-168198 A | 6/2003 |
| JP | 2003-178399 A | 6/2003 |
| JP | 2003-187227 A | 7/2003 |
| JP | 2003-187252 A | 7/2003 |
| JP | 2003-228711 A | 8/2003 |

OTHER PUBLICATIONS

Hideyuki Tamura, "Introduction to Computer Image Processing", Mar. 10, 1985, pp. 127-128, first issue, published by Soken Shuppan, w/ brief English Translation.

Martin A. Fischler, et al., "Random Sample Consensus: A Paradigm for Model Fitting with Applications to Image Analysis and Automated Cartography", 1981, pp. 381-395, vol. 24(6), published by Graphics and Image Processing.

Richard Hartley, et al., "Multiple View Geometry in Computer Vision", Aug. 2000, pp. 101-107, published by Cambridge University Press.

* cited by examiner

DEVICE FOR DETECTING A ROAD TRAVELING LANE USING AN EDGE HISTOGRAM

TECHNICAL FIELD

The present invention relates to a device for detecting a road traveling lane, particularly to the device for detecting the traveling lane from images continuously picked up on a road surface in front of a vehicle.

BACKGROUND ART

For an automatic control of an automobile, or a driving assistance to a driver or the like, it is important to detect a road traveling lane appropriately and stably, from images taken by a camera. Normally, marking lines are painted on a road surface in accordance with various objects, such as lane boundary lines for defining a boundary of a traveling lane (traffic lane), to be mixed with solid lines or broken lines, marking lines made in a different form such as a block-like form, marking lines of different colors such as white or yellow, and further a complex of those marking lines.

Figure 3:
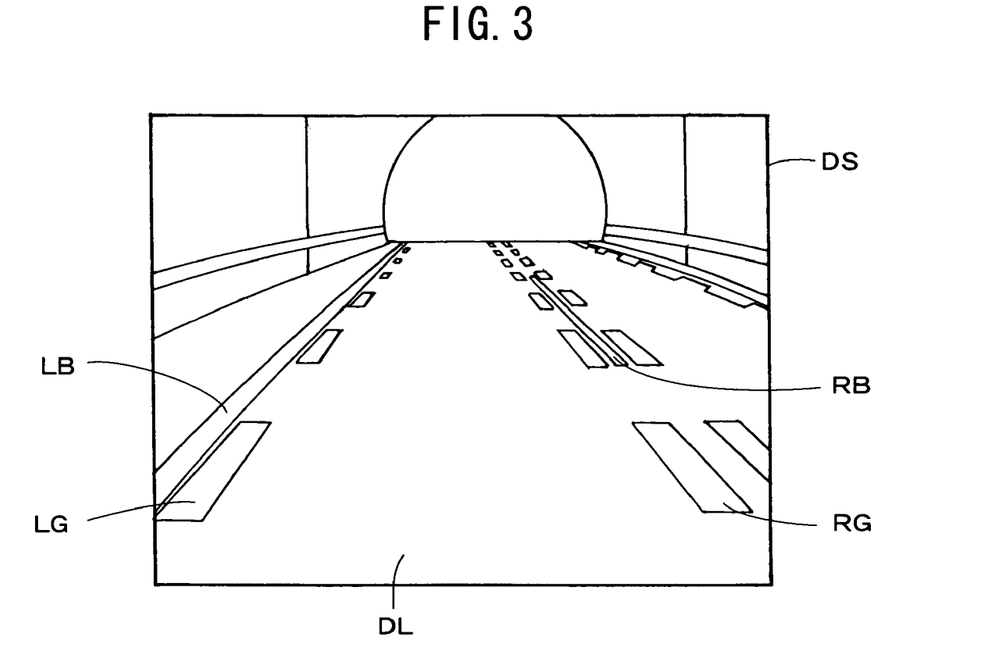
FIG. 3 is a front view of an example of an image picked up according to an embodiment of the present invention.

For instance, FIG. 3 shows an example of an image (DS) including marking lines on a road with 2 vehicle lanes in the vicinity of a tunnel. As a lane boundary line (LB) indicative of a left boundary of a traveling lane (DL), a marking line of a white or yellow rigid line, at the inner side of which a marking line of a white block-like marking line has been used for a traveling guide line (LG). Also, as a lane boundary line (RB) indicative of a right boundary of a traveling lane (DL), a marking line of a white or yellow broken line, at the inner side of which a marking line of a white block-like marking line has been used for a traveling guide line (RG). In general, each width of those lanes is set to be 20 cm, the length of a painted portion of the marking line of broken line is set to be 8 m, and each space portion between the painted portions is set to be 12 m. The width of the block-like marking line is set to be 30 cm, the length of its painted portion is set to be 2-3 m, and each space portion between the painted portions is set to be 2-3 m. In the present application, the lane boundary line or the traveling guide line is meant by the marking line as viewed from its function, whereas when the white line or yellow line on the road surface itself is indicated, it is called as a lane mark.

With respect to the device for detecting the road traveling lane which is defined by the various marking lines as described above, various types have been proposed in the past, as disclosed in Patent document 1, for example. In this document, with respect to a vehicle lane determination device and a vehicle controller, in order to properly set a predetermined reference line for a vehicle, from a plurality of marking lines which are detected and adjacent to each other, it is so constituted as follows. That is, it is so described that the marking lines drawn on the surface of a road is detected from an image taken by a camera, and the marking lines to be a pair of white lines dividing a traveling lane are extracted from them. Then, the interval between the pair of marking lines extracted as the white lines is detected. Under a situation where the interval between the pair of marking lines extracted as the white lines is detected, when the plurality of marking lines adjacent to each other are detected on at least one side of the road from the image taken by the camera, based on the interval between the pair of marking lines as the white lines detected at that time, the pair of marking lines having an interval closest to the interval are extracted as the white lines.

Also, in Patent document 2, in order to detect a traffic lane boundary stably, there is proposed such a traffic lane boundary detector as constituted below. That is, it is provided with first contour line information detection means, sensitivity of which is set for spatial density change of original image data comparatively high and extracts a first contour line information from the image data, second contour line information detection means, sensitivity of which is set for spatial density change of original image data comparatively low and extracts a second contour line information from the image data, and contour extraction means for extracting outermost contour information of a group of white lines from the first and second contour line information detection means, so that the position of traffic lane boundary is set on the basis of the outermost contour information. It is so described that one includes information about edges corresponding to gaps between white lines, with the sensitivity being set for spatial density change to be high, whereas the other one does not include it, so that cancellation of the information about edges corresponding to the gaps will be easily made.

Furthermore, in Patent document 3, for the same object as described above, there is proposed such a traffic lane boundary detector as constituted below. That is, an outermost contour extraction section (reference numeral 15 in the Patent document 3. Same, hereinafter) extracts an outermost contour information of a group of white lines based on the contour data including the original image data stored in a frame buffer section (13) and the positional information of edge detected by an edge detection section (14). It is described that the outermost contour extraction section (15) determines whether or not the edge corresponds to the gaps generate between the white lines to constitute the group of white lines, based on the contour data including the positional information of the edge extracted from the original image data, and deletes the edge corresponding to the gaps from the contour data.

And, in Patent document 4, for the same object as described above, there is proposed a device for detecting a traffic lane boundary as constituted below. That is, a traveling lane of a mobile body including traffic lane in a predetermined area is taken by image pickup means, to obtain image data. Based on the obtained image data, density histograms are provided, and aggregation of the density histograms is detected, to be grouped. Then, among the grouped histograms, first center positions which are the centers of individual histograms, are detected, and based on the first center positions, second center positions which correspond to the centers in the grouped aggregation of histograms, are detected. Furthermore, it is described that based on the second center positions between the histograms in different groups of histograms, the center of a lane mark or lane mark groups having a plurality of lane marks is detected, to determine the position of the lane mark boundary, so that a stable detection of the lane mark boundary can be achieved, with the histograms produced on the basis of the image data.

On the other hand, with respect to an image processing technique, Hough conversion has been widely known as a method for detecting a straight line, as explained in Non-patent document 1 as listed below, for example. The Hough conversion has been known as the method for detecting a straight line to be robust against noise, and characterized in that during a process for converting points on a (x, y) coordinate system into a curve on a ($\rho$, $\theta$) polar coordinate system, the curve on the ($\rho$, $\theta$) polar coordinate system converted from edge points provided on a common straight line on the (x, y) coordinate system, intersects at a single point. Furthermore, recently, in a computer vision, RANSAC (Random Sample Consensus) which is a kind of Robust paradigm, has become popular, as explained in detail in Non-patent document 2 as listed below, for example. Also, RANSAC has been explained in Non-patent document 3 as listed below.

Patent document 1:
Japanese Patent Laid-open Publication 2003-168198
Patent document 2:
Japanese Patent Laid-open Publication 2003-187227
Patent document 3:
Japanese Patent Laid-open Publication 2003-187252
Patent document 4:
Japanese Patent Laid-open Publication 2003-178399
Non-patent document 1:
Pages 127 and 128 of "Introduction to Computer Image Processing" edited by Hideyuki Tamura, first issue, first print, published by Soken Shuppan, on Mar. 10, 1985
Non-patent document 2:
Pages 381-395 of "Random Sample Consensus: A Paradigm for Model Fitting with Applications to Image Analysis and Automated Cartography" written by Martin A. Fischero and Robert C. Bolles, vol. 24(6), published by Graphics and Image Processing, in 1981
Non-patent document 3:
Pages 101-107 of "Multiple View Geometry in Computer Vision" written by Richard Hartley and Andrew Zisserman, published by Cambridge University Press., in August, 2000

DISCLOSURE OF THE INVENTION

Problems to be Solved by the Invention

In the Patent document 1 as cited above, it is described that when the plurality of marking lines adjacent to each other are detected on at least one side of the road, based on the interval between the pair of marking lines as the white lines detected at that time, the pair of marking lines having the interval closest to the interval are extracted as the white lines, so that it is set to be prerequisite that the interval between the opposite marking lines is constant. And, it is not easy to define a reference line among the plurality of marking lines, so that a further improvement is required.

Also, in the Patent document 2 as cited above, it is described that through two kinds of methods for detecting the outermost contour, with the sensitivity thereof being set to be different for spatial density change, the outermost contour position is defined, with the sensitivity for the intervals among the plurality of marking lines being lowered. It is very difficult to detect the marking line provided on the original lane boundary, although it is possible to define the outermost contour position stably, even if contrast between the marking line and the interval is insufficient, or it is saturated to destroy the images.

Furthermore, according to the device as described in the Patent document 3, it has been so constituted that the outermost contour position is extracted, with the data being neglected to be employed, in the case where the intervals between the edges are narrow, and the difference in density between the opposite edge positions is small. Therefore, it is very difficult to detect the marking line provided on the original lane boundary, although it is possible to define the outermost contour position stably, like in the above-described case.

Then, according to the device as described in the Patent document 4, it has been so constituted that the histograms of edges obtained by differentiating the image are produced to be grouped, to detect the center positions of individual marking lines, or the center positions for the groups, to employ the center line or inner most position as the reference line depending on the number of marking lines. It can be hardly said that it is fully responsive to the requirement for stably defining the position of the lane boundary. Especially, as the block-like marking line shown in FIG. 3 is as wide as 30 cm, supposing that this block-like marking line is recognized as the lane boundary on the opposite sides of the traveling lane, the lane width (width between the traffic lines), including the interval between the block-like marking line and the actual lane boundary, will become narrower by 1 m or less, comparing with the actual lane width, so that there may be a case where it is difficult to achieve a smooth traveling control or the like. Therefore, it is necessary to define the block-like marking lines against the boundary of traveling lane.

Accordingly, in a device for detecting a road traveling lane from images continuously picked up on a road surface in front of a vehicle, it is an object of the present invention to provide the device for detecting the road traveling lane, which is capable of stably defining a position of a boundary of the traveling lane.

Means for Solving the Problems

In accomplishing the above-described object, in a device for detecting a road traveling lane from images on a road surface continuously picked up by image pickup means, the present invention comprises edge point detection means for detecting a plurality of edge points in a contour on the image, edge histogram producing means for producing a vertical edge histogram for horizontal elements of the plurality of edge points detected by said edge point detection means, block marking line determination means for determining presence and absence of a block-like marking line on the basis of periodicity of distribution and a combination of distributions of plus edges and minus edges in the vertical edge histogram produced by said edge histogram producing means, and defining a region where said block-like marking line is present, lane boundary edge detection means for detecting vertical edge points present outside of a center of said traveling lane, in the region where said block-like marking line defined by said block marking line determination means is present, and lane boundary position defining means for defining a position of a curve fitted to the vertical edge points detected by said lane boundary edge detection means, as a position of a boundary of said traveling lane. In this connection, the above-described curve includes the one with a plurality of straight lines substantially forming the curve.

Also, in a device for detecting a road traveling lane from images on a road surface continuously picked up by image pickup means, the present invention may comprise edge point detection means for detecting a plurality of edge points from a contour on the image, edge histogram producing means for producing a horizontal edge histogram for vertical elements of the plurality of edge points detected by said edge point detection means, block marking line determination means for determining presence and absence of a block-like marking line on the basis of periodicity of distribution and a combination of distributions of plus edges and minus edges in the horizontal edge histogram produced by said edge histogram producing means, and defining a region where said block-like marking line is present, lane boundary edge detection means for detecting vertical edge points present outside of a center of said traveling lane, in the region where said block-like marking line defined by said block marking line determination means is present, and lane boundary position defining means for defining a position of a curve fitted to the vertical edge points detected by said lane boundary edge detection means, as a position of a boundary of said traveling lane.

Furthermore, in a device for detecting a road traveling lane from images on a road surface continuously picked up by image pickup means, the present invention may comprise edge point detection means for detecting a plurality of edge points in a contour on the image, vertical edge histogram producing means for producing a vertical edge histogram for horizontal elements of the plurality of edge points detected by said edge point detection means, block marking line determination means for determining presence and absence of a block-like marking line on the basis of periodicity of distribution and a combination of distributions of plus edges and minus edges in the vertical edge histogram produced by said vertical edge histogram producing means, horizontal edge histogram producing means for producing a horizontal edge histogram for vertical elements of the plurality of edge points detected by said edge point detection means, and lane boundary position defining means for determining a plurality of vertical edge points, whose vertical edge histogram varies periodically in response to traveling of said vehicle, and which were determined to be closest to a center of said traveling lane on the basis of the horizontal edge histogram produced by said horizontal edge histogram producing means, and defining a position of a curve fitted to the plurality of edge points present outside of the center of said traveling lane, as a position of a boundary of said traveling lane.

Furthermore, said edge point detection means may be constituted by detecting the plurality of edge points on the image picked up by said image pickup means, and making a reverse projection of coordinate data of the plurality of edge points on a 3-dimensional road surface coordinate, to provide said plurality of edge points.

Effects of the Invention

As the present invention is constituted as described above, the following effects will be achieved. That is, as the block-like marking line can be separated from the boundary of the traveling lane, and cancelled certainly by means of each edge histogram, the position of the boundary of the traveling lane can be defined stably.

With the edge point detection means being constituted as described above, the plurality of edge points can be detected and processed appropriately.

VD: image pickup means
ED: edge point detection means
HD: edge histogram producing means
BD: block marking line determination means
MD: lane boundary edge detection means
LD: lane boundary position defining means
CM: camera
VB: video input buffer circuit
SY: synchronous separation circuit
FM: frame memory
VC: image processing section
VP: image data control section
EP: edge point detection section
HP: edge histogram producing section
BP: block marking line determination section
MP: lane boundary edge detection section
LP: lane boundary position defining section

BEST MODE FOR CARRYING OUT THE INVENTION

Figure 1:
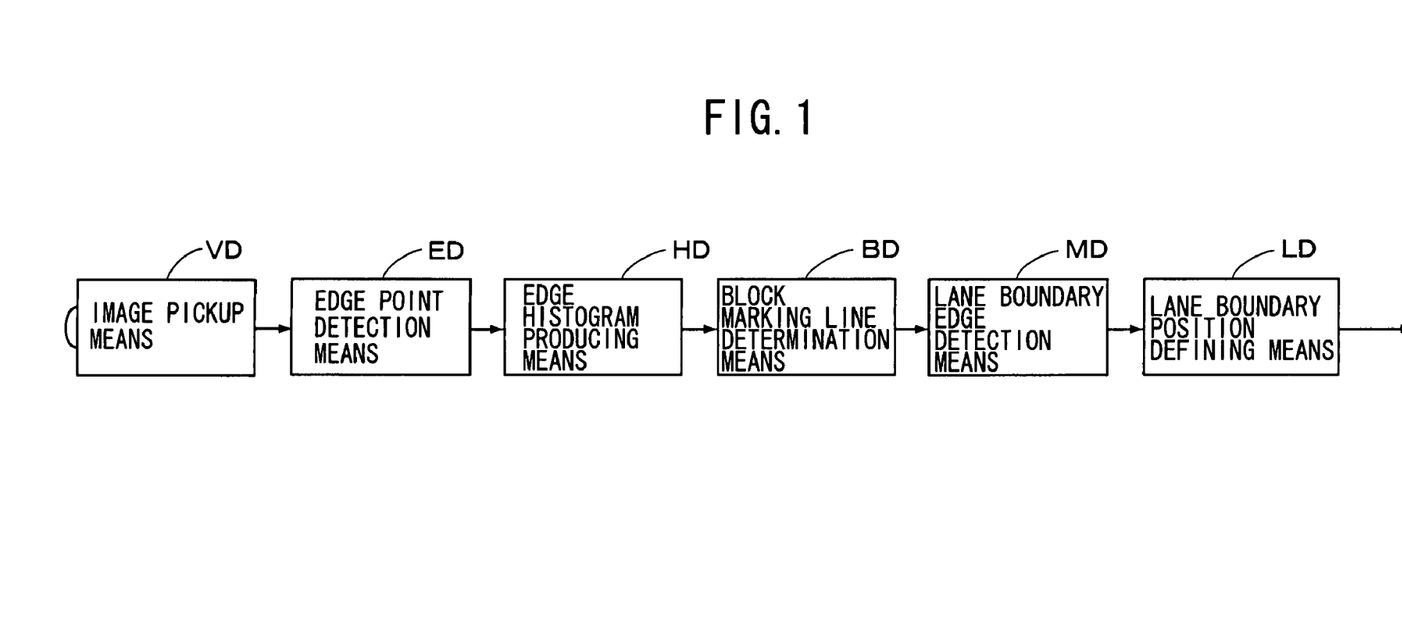
FIG. 1 is a block diagram showing main components of a device for detecting a road traveling lane according to an embodiment of the present invention.

A practical embodiment of the device for detecting a road traveling lane of the present invention as constituted above will be described hereinafter with reference to the drawings. FIG. 1 shows an embodiment of the device which is adapted to pick up images on a road surface continuously by image pickup means (VD), and detect a traveling lane from the picked up image. According to the present embodiment, it is provided with edge point detection means (ED) which detects a plurality of edge points from a contour on the image, edge histogram producing means (HD) which produces a vertical edge histogram for horizontal elements of the plurality of edge points detected by the edge point detection means (ED), block marking line determination means (BD) which determines presence and absence of a block-like marking line on the basis of periodicity of distribution and a combination of distributions of plus edges and minus edges in the vertical edge histogram produced by the edge histogram producing means (HD), and which defines a region where the block-like marking line is present, and lane boundary edge detection means (MD) which detects vertical edge points produced outside of a center of the traveling lane, in the region where the block-like marking line defined by the block marking line determination means (BD) is present. And, according to lane boundary position defining means (LD), it is so constituted to define a position of a curve fitted to the vertical edge points detected by the lane boundary edge detection means (MD), as a position of a boundary of the traveling lane. The edge histogram may be called as a derivative histogram.

In the apparatus for detecting a road traveling lane as shown in FIG. 1, the edge histogram producing means (HD) may be constituted such that a horizontal edge histogram is produced for vertical elements of the plurality of edge points detected by the edge point detection means (ED), and that block marking line determination means (BD) determines the presence and absence of a block-like marking line on the basis of periodicity of distribution and a combination of distributions of plus edges and minus edges in the horizontal edge histogram produced by the edge histogram producing means (HD), and defines the region where the block-like marking line is present.

Figure 2:
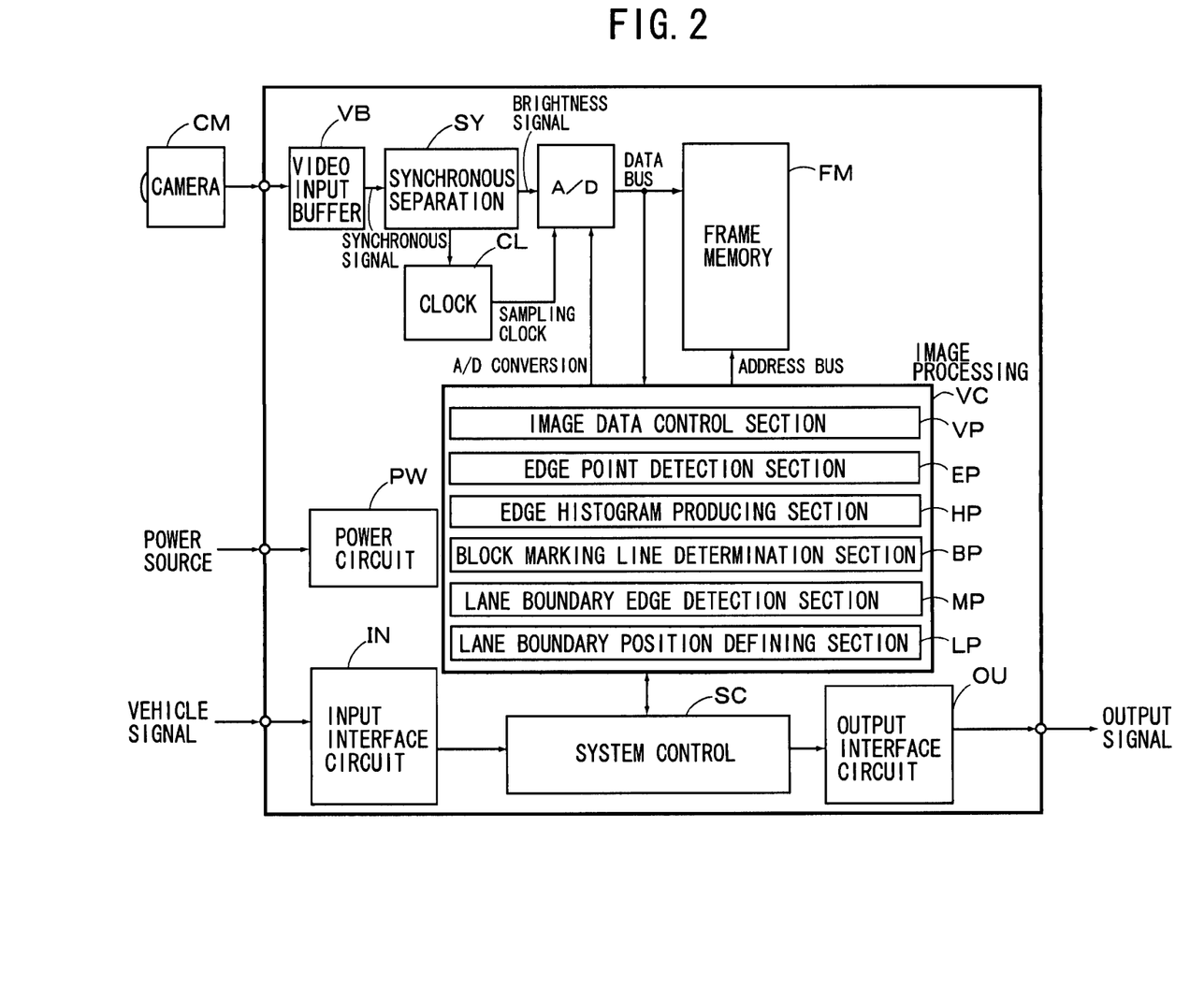
FIG. 2 is a block diagram showing a hardware of a device for detecting a road traveling lane according to an embodiment of the present invention.

The device for detecting a road traveling lane as shown in FIG. 1 has a hardware as shown in FIG. 2. That is, in front of a vehicle which is not shown herein, as for the image pickup means (VD), a CCD camera (hereinafter, simply referred to as camera) CM is installed, for example, whereby images of the view in front of the vehicle including the road surface are picked up continuously. The image signals of the camera (CM) are converted from analogue signals to digital signals through a video input buffer circuit (VB) and synchronous separation circuit (SY), and stored in a frame memory (FM). The image data stored in the frame memory (FM) are processed by an image processing section (VC). The image processing section (VC) is constituted by a image data control section (VP), edge point detection section (EP), edge histogram producing section (HP), block marking line determination section (BP), lane boundary edge detection section (MP) and lane boundary position defining section (LP). The edge point detection section. (EP), edge histogram producing section (HP), block marking line determination section (BP), lane boundary edge detection section (MP) and lane boundary position defining section (LP) correspond to the edge point detection means (ED), edge histogram producing means (HD), block marking line determination means (BD), lane boundary edge detection means (MD) and lane boundary position defining means (LD) as shown in FIG. 1, respectively.

According to the image processing section (VC), the image data in the frame memory (FM) are addressed by the image data control section (VP) and sent to the edge point detection section (EP), where a plurality of edge points are detected. According to the present embodiment, a vertical edge histogram is produced for the horizontal elements of the edge points in the edge histogram producing section (HP). On the basis of periodicity of distribution and a combination of distributions of plus edges and minus edges in the vertical edge histogram, the presence and absence of a block-like marking line is determined, and the region where the block-like marking line is present, is defined in the block marking line determination section (BP). Furthermore, vertical edge points provided vertically outside of the region where the block-like marking line is present (i.e., outside of a center of the traveling lane) are detected in the lane boundary edge detection section (MP), and a curve is applied to them in the lane boundary position defining means (LD). That is, a position of the curve which is fitted to the vertical edge points detected in the lane boundary edge detection section (MP) is defined as a position of a boundary of the traveling lane.

The position of the boundary of the traveling lane as defined above is fed to a system control section (SC, computer), together with the detected results of a width of the traveling lane, radius of curvature of the road, position relative to the own vehicle, attitude angle or the like, additionally if necessary, and output to an outside system devices (not shown) through an output interface circuit (OU). Furthermore, (CL), (PW), (IN) in FIG. 2 are clock circuit, electric power source circuit, and input interface circuit, respectively.

Hereinafter, will be explained processes in each of the edge point detection section (EP), edge histogram producing section (HP), block marking line determination section (BP), lane boundary edge detection section (MP) and lane boundary position defining section (LP) as described above. At the outset, according to the edge point detection section (EP), a plurality of edge points are detected from the image (DS) picked up by the camera (CM), as shown in FIG. 3, and a reverse projection is made from an image plane (not shown) of the plurality of edge points on a 3-dimensional road surface coordinate. That is, on the basis of the plurality of edge points detected on the image plane and parameters of the camera (CM), coordinate data of the plurality of edge points are reversely projected as a group of points on a coordinate of the 3-dimensional road surface as shown in FIGS. 4 and 5.

Figure 4:
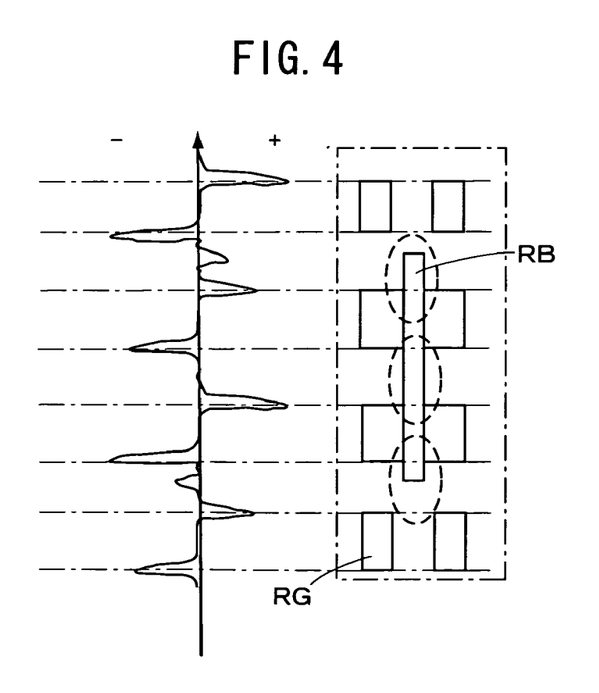
FIG. 4 is a plan view showing an example of producing a vertical edge histogram from a plurality of edge points projected on a road surface coordinate according to an embodiment of the present invention.
Figure 5:
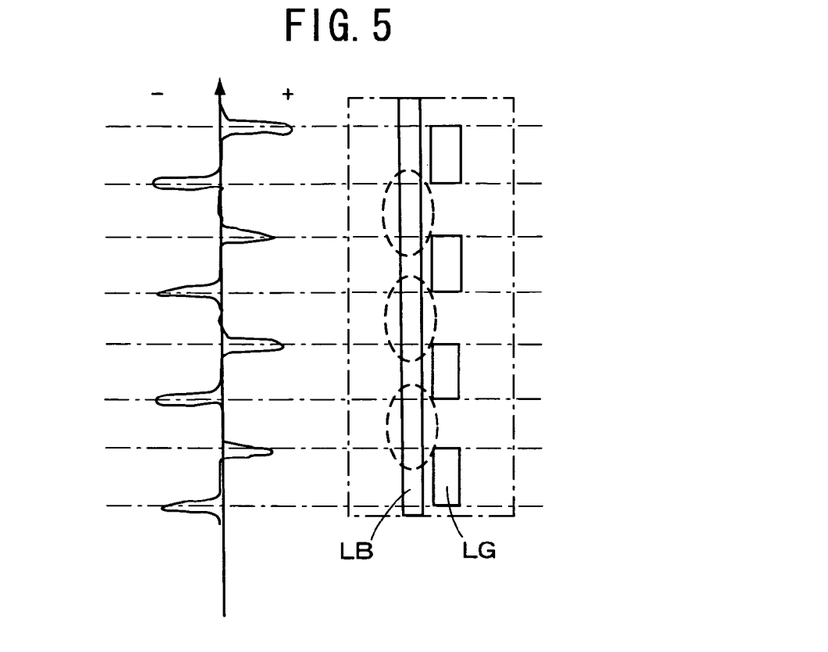
FIG. 5 is a plan view showing another example of producing a vertical edge histogram from a plurality of edge points projected on a road surface coordinate according to an embodiment of the present invention.

In the edge histogram producing section (HP), as shown at the left side of in FIGS. 4 and 5, the vertical edge histogram is produced for the horizontal elements of the plurality of edge points (contour portion of a white line (RB) or the like as the lane marking in FIGS. 4 and 5), which are reversely projected on the road surface. At the right side in FIGS. 4 and 5, the straight line for the contour portion of the white line (RB) or the like indicates a group of edge points. In the vertical edge histogram, a region between a plus edge and a minus edge, i.e., a region in a vertical direction (upward and downward in FIGS. 4 and 5) between the edge histogram in the plus (+) direction and the edge histogram in the minus (−) direction in FIGS. 4 and 5, corresponds to an interval between neighboring block lines. Therefore, at the intervals between neighboring block lines, edges (encircled by broken lines in FIGS. 4 and 5) of the lane boundary can be detected. In other words, when a scanning process is applied from the inner side of the traveling lane toward the outer side thereof (rightward in FIG. 4, and leftward in FIG. 5), an edge point detected at first is provided as the edge point for a marking line indicative of a lane boundary, except for the edge point of each block-like marking line. Accordingly, in the lane boundary edge detection section (MP), can be detected the vertical edge points, which are provided outside of the region where the block-like marking line (relative to the center of the traveling lane) is present.

In the lane boundary position defining section (LP), a curve is applied to the group of vertical edge points detected in the lane boundary edge detection section (MP) as described above, to be defined as a position of boundary of the traveling lane. According to the aforementioned RANSAC, for example, a curve including a plurality of straight lines is fitted to achieve a curve-fitting. As for this fitting of the curve (curve-fitting), the aforementioned Hough conversion may be used, or for instance, a least square method can be used. Also, the plurality of edge points may be grouped on the basis of a predetermined property, and applied with the curve-fitting.

According to the aforementioned embodiment, it has been so constituted that the region where the block-like marking line is present, is determined on the basis of periodicity of distribution and the combination of distributions of plus edges and minus edges in the vertical edge histogram. As described before, the presence and absence of the block-like marking line may be determined on the basis of periodicity of distribution and the combination of distributions of plus edges and minus edges in the horizontal edge histogram, an example of which is shown at a lower part in FIG. 6.

Figure 6:
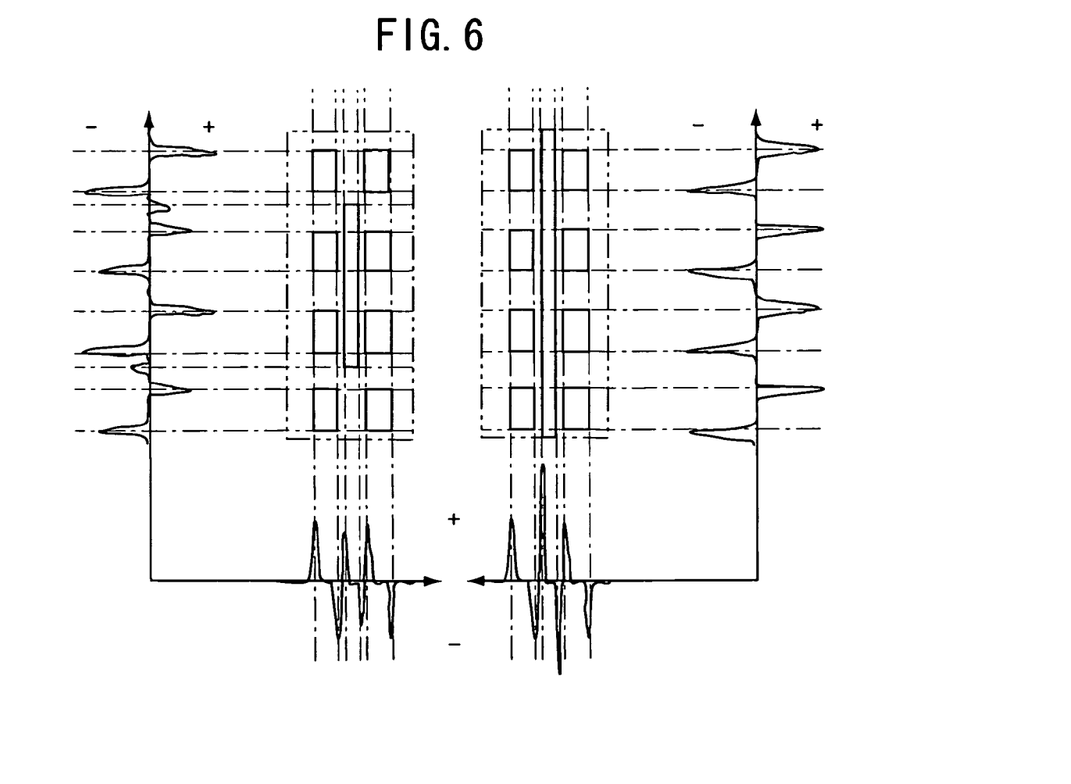
FIG. 6 is a plan view showing an example of determining a complex-lines area by means of a vertical edge histogram and a horizontal edge histogram according to another embodiment of the present invention.

Furthermore, as for another embodiment of the present invention, the presence and absence of the block-like marking line can be determined, on the basis of a state of a vertical edge histogram and a horizontal edge histogram which are provided for the detected group of edge points, as shown in FIG. 6. At the outset, an image plane (not shown) for a plurality of edge points is reversely projected on the coordinate of the 3-dimensional road surface as described before. Then, on this road surface coordinate, a region which is capable of including a plurality of lane marks (complex lines) is set. For example, a horizontal distance is set to be 50 cm, with an interval of 5 cm and a margin of 15 cm added to a block width of 30 cm, provided for the inner side of the traveling lane close to the center of the traveling lane, and set to be 70 cm, with the interval of 5 cm and the margin of 15 cm added to a white line width of 20 cm and the block width of 30 cm, provided for its outer side. And, a distance between them in the vertical direction (upward and downward in FIG. 6), or the distance in an advancing direction of a vehicle is set to be 5 m, as the region which is capable of providing the white line (lane mark) as a straight line, even in case of cornering operation.

In the present embodiment, the device is not provided with the lane boundary edge detection section (MP) as shown in FIG. 2, instead, the vertical edge histogram is produced for the horizontal elements of the group of edge points, as shown in left and right parts of FIG. 6, and the horizontal edge histogram is produced for the vertical elements, as shown in the lower part of FIG. 6. In the case where a vehicle is traveling on a lane provided between marking lines such as block lines or broken lines, such as the case where the vehicle is traveling on an up-hill lane, the edge histogram for the group of edge points varies periodically, in the vertical direction and horizontal direction, relatively to the advancing direction of the vehicle. The periodical variation as described above can be detected, even in such a case where the white lines (LB, LG, RB, RG in FIG. 3) have become hardly visible or dirty.

According to the present embodiment, when both of the vertical edge histogram and horizontal edge histogram vary periodically, it can be determined that a plurality of lane marks are present, to be in the complex-lines area. Therefore, if the cycle of the edge histogram to be produced is within a predetermined range, it can be determined as the complex lines. And, if the peak appears inside of the traveling lane in the horizontal edge histogram, periodically in each of image planes including prior image planes, the lane is determined to be a block-like marking lane which is present inside of the traveling lane. When the marking lane is determined to be the block-like marking lane, it is removed from the traveling lane boundary to be, and the marking lane outside of the block-like marking line relative to the lane center is set to be the boundary of the traveling lane, in the lane boundary position defining section (LP).

Accordingly, if it is determined in the block marking line determination section (BP) that there is the block-like marking line, then it is determined in the lane boundary position defining section (LP) that a position of a curve fitted to a plurality of edge points which are present outside of the center of the traveling lane, relative to the plurality of vertical edge points, whose vertical edge histogram varies periodically in response to traveling of the vehicle, and which were determined to be closest to the center of the traveling lane on the basis of the horizontal edge histogram, is defined to be the position of boundary of the traveling lane.

As described above, as for the marking lines for indicating the lane boundary provided on the traveling road surface, other than simple rigid lines and broken lines, there exist a plurality of lines in combination of the simple marking lines and the block-like marking lines. According to the prior apparatus, therefore, it was difficult to define the marking line (lane boundary line) as required to indicate as the lane boundary, stably. In any of the embodiments as described above in the present application, however, the position of the lane boundary line can be defined stably. Consequently, can be achieved determination of the boundary satisfied with high reliability as required by a warning system or a control system.

POSSIBILITY OF INDUSTRIAL APPLICATION

As the device for detecting a road traveling lane according to the present invention, the position of the lane boundary line on the traveling lane can be defined stably, it can be applied to various warning systems and control systems of vehicles or the like, for example.

The invention claimed is:
1. A device for detecting a road traveling lane, comprising:
image pickup means for picking up images on a road surface continuously,
edge point detection section for detecting a plurality of edge points in a contour on the image;
edge histogram producing section for producing a vertical edge histogram for horizontal elements of the plurality of edge points detected by said edge point detection section;
block marking line determination section for determining presence and absence of a block-like marking line on the basis of periodicity of distribution and a combination of distributions of plus edges and minus edges in the vertical edge histogram produced by said edge histogram producing section, and defining a region where said block-like marking line is present;
lane boundary edge detection section for detecting vertical edge points present outside of a center of said traveling lane, in the region where said block-like marking line defined by said block marking line determination section is present; and
lane boundary position defining section means-for defining a position of a curve fitted to the vertical edge points detected by said lane boundary edge detection section, as a position of a boundary of said traveling lane;
wherein said lane boundary edge detection section detects the edges of the lane boundary in an interval between neighboring block lines, on the basis of such a relationship that a vertical region between a peak of a plus edge histogram and a peak of a minus edge histogram corresponds to the interval between neighboring block lines, in said vertical edge histogram produced by said edge histogram producing section.

2. A device for detecting a road traveling lane as described in claim 1, wherein said edge point detection section detects the plurality of edge points on the image picked up by said image pickup means, and makes a reverse projection of coordinate data of the plurality of edge points on a 3-dimensional road surface coordinate, to produce said plurality of edge points.

3. A device for detecting a road traveling lane as described in claim 1, wherein said lane boundary position defining section applies a curve including a plurality of straight lines to the vertical edge points detected by said lane boundary edge detection section, to achieve a curve-fitting.

4. A device for detecting a road traveling lane as described in claim 3, wherein said lane boundary position defining section achieves said curve-fitting by means of one of RANSAC, Hough conversion and least square method.

5. A device for detecting a road traveling lane, comprising:
image pickup means for picking up images on a road surface continuously;
edge point detection section for detecting a plurality of edge points in a contour on the image;
vertical edge histogram producing section for producing a vertical edge histogram for horizontal elements of the plurality of edge points detected by said edge point detection section;
horizontal edge histogram producing section for producing a horizontal edge histogram for vertical elements of the plurality of edge points detected by said edge point detection section;
block marking line determination section for determining presence and absence of a block-like marking line on the basis of periodicity of distribution and a combination of distributions of plus edges and minus edges in both the vertical edge histogram produced by said vertical edge histogram producing section and the horizontal edge histogram producing by said horizontal edge histogram producing section; and lane boundary position defining section for determining a plurality of vertical edge points, whose vertical edge histogram varies periodically in response to traveling of said vehicle, and which were determined to be closest to a center of said traveling lane on the basis of the horizontal edge histogram produced by said horizontal edge histogram producing section, and defining a position of a curve fitted to the plurality of edge points present outside of the center of said traveling lane, as a position of a boundary of said traveling lane.

6. A device for detecting a road traveling lane as described in claim 5, wherein said edge point detection section detects the plurality of edge points on the image picked up by said image pickup means, and makes a reverse projection of coordinate data of the plurality of edge points on a 3-dimensional road surface coordinate, to produce said plurality of edge points.

7. A device for detecting a road traveling lane as described in claim 5, wherein said lane boundary position defining section applies a curve including a plurality of straight lines to the vertical edge points detected by said lane boundary edge detection section, to achieve a curve-fitting.

8. A device for detecting a road traveling lane as described in claim 7, wherein said lane boundary position defining section achieves said curve-fitting by means of one of RANSAC, Hough conversion and least square method.

* * * * *